United States Patent [19]
Roberson

[11] Patent Number: 5,365,550
[45] Date of Patent: Nov. 15, 1994

[54] INITIAL SYNCHRONIZATION AND TRACKING CIRCUITS FOR SPREAD SPECTRUM RECEIVERS

[75] Inventor: David L. Roberson, Forest, Va.

[73] Assignee: Pulse Electronics, Inc., Rockville, Md.

[21] Appl. No.: 732,461

[22] Filed: Jul. 18, 1991

[51] Int. Cl.$^5$ .................................. H04L 27/30
[52] U.S. Cl. .................................. 375/1; 380/34
[58] Field of Search ................ 375/1, 115; 380/34

[56] References Cited

U.S. PATENT DOCUMENTS

| | | | |
|---|---|---|---|
| 3,402,265 | 9/1968 | Couvillon, Jr. ............... | 375/115 |
| 4,039,749 | 8/1977 | Gordy et al. ................ | 375/115 |
| 4,122,393 | 10/1978 | Gordy et al. ................ | 375/1 |
| 4,351,064 | 9/1982 | Ewanus ..................... | 380/34 |

*Primary Examiner*—Bernarr E. Gregory
*Attorney, Agent, or Firm*—Whitham, Curtis, Whitham & McGinn

[57] ABSTRACT

A direct sequence digital spread spectrum receiver acquires and maintains synchronization in a reliable, yet simple manner, even under severe multipath and interference conditions. A sliding correlator and a voltage controlled crystal oscillator (VCXO) coöperate to acquire initial synchronization, and once synchronization is acquired, the VCXO is linearly frequency modulated (FM) for accurate tracking. The difficult problem of keeping the receiver code clock synchronized to that of the transmitter under severe multipath and interference conditions is solved by virtue of a dual switched bandwidth low pass filter section of the tracking circuit, allowing a wide bandwidth for initial acquisition and tracking but once the clocks are aligned, a narrow loop takes over that follows the transmitter closely. A commercially available intermediate frequency (IF) integrated circuit (IC) is used as an amplitude modulated (AM) detector to achieve the large dynamic range required. The IF IC has an internal received signal strength indicator (RSSI) output which is used to demodulate the amplitude variations generated by the tracking circuit.

5 Claims, 6 Drawing Sheets

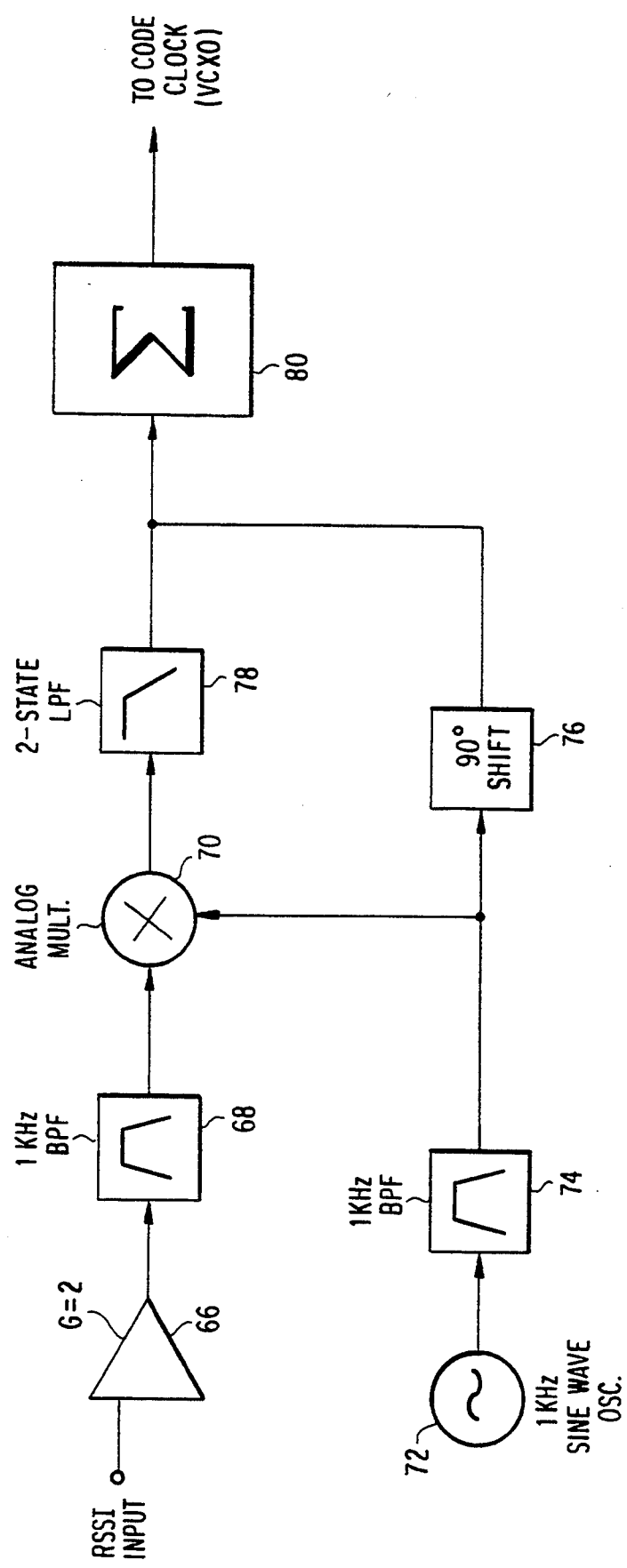

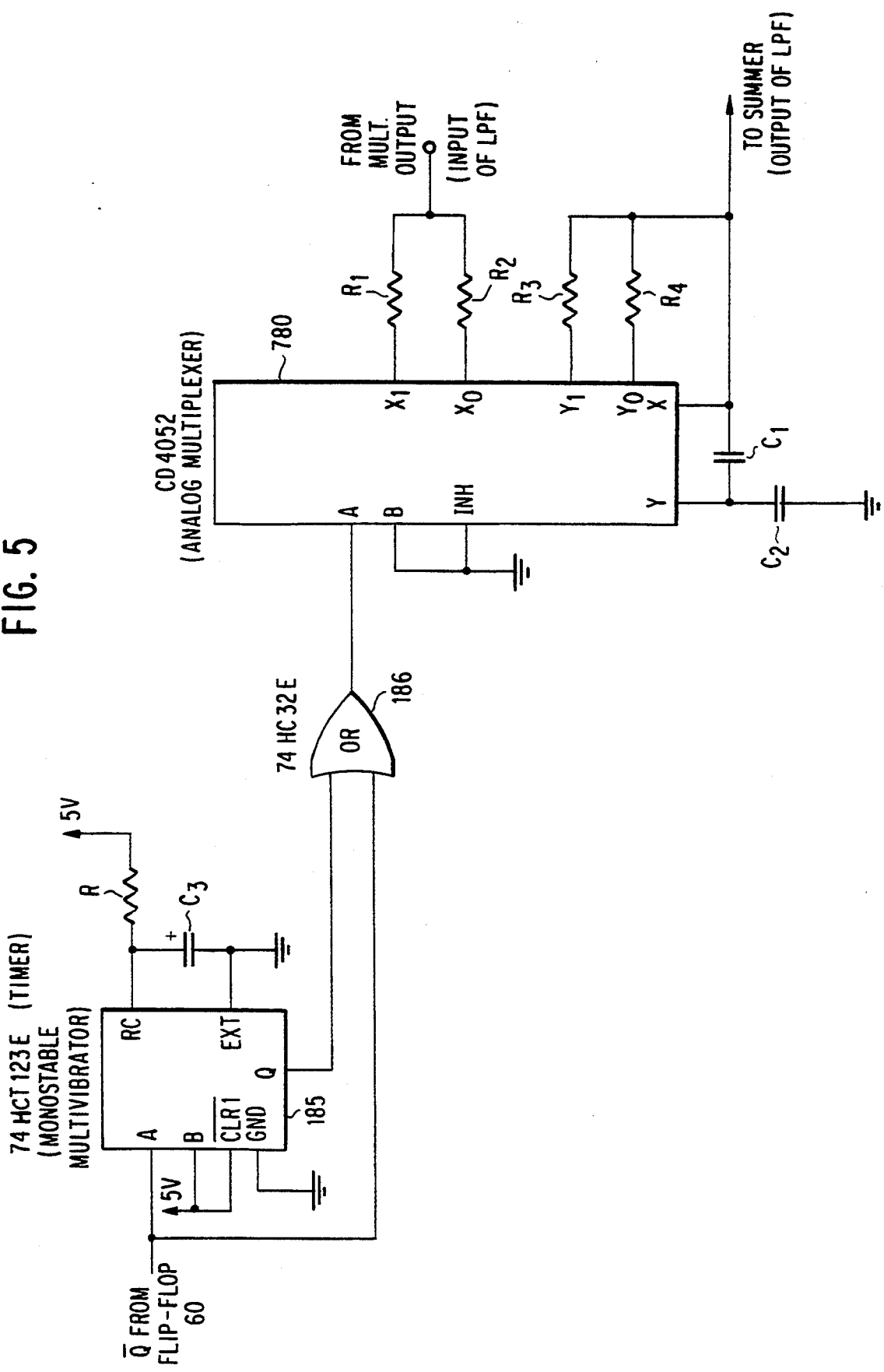

INITIAL SYNCHRONIZATION AND TRACKING CIRCUITS FOR SPREAD SPECTRUM RECEIVERS

BACKGROUND OF THE INVENTION

1. Field of the Invention

The present invention generally relates to reliable communications systems and, more particularly, to a spread spectrum communications receiver of the direct sequence digital type incorporating improved initial synchronization and tracking circuits.

2. Description of the Prior Art

Spread spectrum communications offer several advantages in communications applications requiring high reliability. These include low density power spectra and interference rejection. In the case of interference rejection, the interference may be accidental, that is, simply a part of the environment of the communication system, or intended, that is, some form of jamming.

There are several types of spread spectrum systems including direct sequence digital systems, frequency hopping systems, time hopping systems, pulsed frequency modulated (or chirp) systems, and various hybrids. Of these, the direct sequence digital systems and the frequency hopping systems are perhaps the more widely implemented. In a direct sequence digital system, a pseudorandom code generator is used to modulate a frequency modulated carrier. In a frequency hopping system, a coherent local oscillator is made to jump from one frequency to another.

The subject invention belongs to the direct sequence digital type of spread spectrum communications system. A description of this and other types of spread spectrum communications systems may be found, for example, in *Spread Spectrum Systems,* 2nd Ed., by Robert C. Dixon, John Wiley & Sons (1984), and *Spread Spectrum Communications*, Vol. II, by M. K. Simon et al., Computer Science Press (1985).

Direct sequence digital spread spectrum receivers present a significant design challenge in synchronizing the receiver clock with the transmitter clock, particularly under severe multipath and interference conditions. The sliding correlator technique of acquiring initial synchronization known in the prior art is typically used due to its inherently simple, yet predictable nature. Once synchronization is acquired, a Tau-dither technique known in the prior art is typically used to track the transmitter clock. However, multipath interference tends to result in rapid changing of perceived transmitter code clock rate, often resulting in a loss of synchronization. Attempts to improve the performance of these techniques have been quite complex and expensive.

SUMMARY OF THE INVENTION

It is therefore an object of the present invention to provide a direct sequence digital spread spectrum receiver which is capable of acquiring and maintaining synchronization in a reliable, yet simple manner, even under severe multipath and interference conditions.

The subject invention provides an efficient marriage of the sliding correlator and a well designed voltage controlled crystal oscillator (VCXO) that is able to be "frequency pulled" a relatively large amount and later linearly frequency modulated (FM) for accurate tracking. The invention solves the difficult problem of keeping the receiver code clock synchronized to that of the transmitter under severe multipath and interference conditions by virtue of a dual switched bandwidth in the low pass filter section of the tracking circuit. This is a unique technique that allows a wide bandwidth for initial acquisition and tracking but once the clocks are aligned, a narrow loop takes over that follows the transmitter closely. This dual bandwidth low pass filter section is highly effective in filtering out the apparent rapid changes in transmitter code clock rate due to multipath interference.

The present invention also allows the design of simple, cost effective circuit blocks to achieve the desired goal. Prior art typically uses a complex pulse sliding-/subtraction scheme to allow the receiver code to slip past the incoming transmit code. In this invention, a d.c. voltage is applied to the VCXO to generate the slipping code. In a similar manner, the present invention uses an easily generated sinewave to frequency modulate the VCXO while, in the prior art, it is customary to use a fractional code clock rate shift circuit for the same results. The prior art technique is not only more complex, it is much more difficult to realize in a practical circuit.

The subject invention also is a unique application of a commercially available intermediate frequency (IF) integrated circuit (IC) as an amplitude modulated (AM) detector to achieve the large dynamic range required. The IF IC has an internal received signal strength indicator (RSSI) output having particular application in cellular communications systems. As used in this invention, however, the RSSI is used to demodulate the amplitude variations generated by the tracking circuit. Prior art typically uses automatic gain control (AGC) circuitry to allow a detector to operate with less dynamic range. The AGC of the prior art has it limitations of speed and overhead which are not present in the present invention.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a schematic diagram of the tracking circuit of the invention;

FIG. 5 is a schematic and block diagram of the two-state loop filter used in the tracking circuit shown in FIG. 4.

DETAILED DESCRIPTION OF A PREFERRED EMBODIMENT OF THE INVENTION

Figure 1:
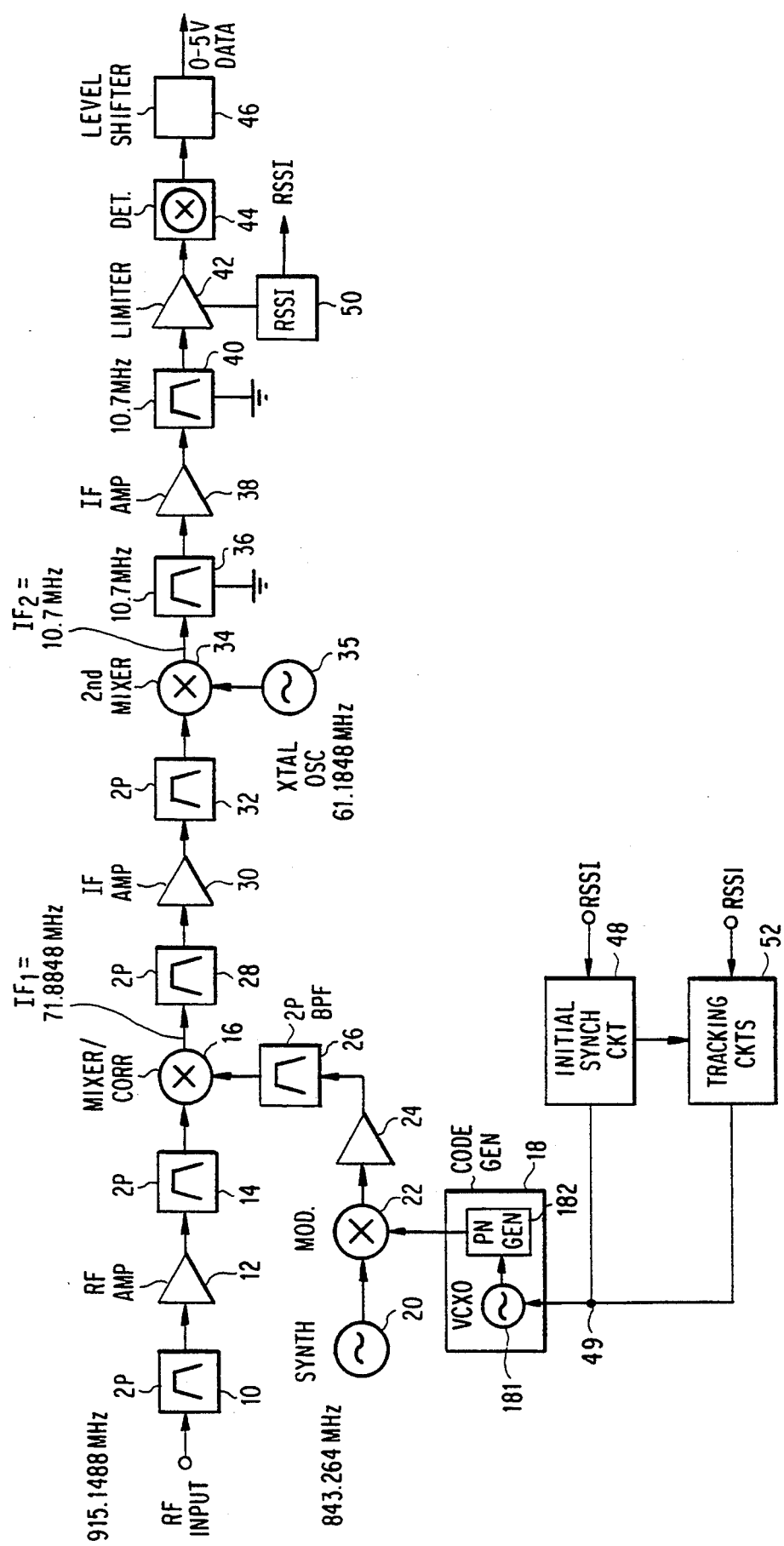
FIG. 1 is a block diagram of the spread spectrum receiver incorporating the improved initial synchronization and tracking circuits according to the present invention.

Referring now to the drawings, and more particularly to FIG. 1, there is shown a block diagram of a direct sequence digital type spread spectrum receiver. The radio frequency (RF) signal input from an antenna, for example, is applied to a two pole bandpass filter 10 and then to an RF amplifier 12. The signal output of amplifier 12 is applied to three pole bandpass filter 14 and then to a mixer/correlator 16. The signal from filter 14 is mixed in mixer/correlator 16 with a second frequency signal to produce a difference signal output.

The second frequency signal input to the mixer/correlator 16 is produced by the receiver's code generator 18 which is basically similar to the code generator (not shown) in the transmitter. The code generator 18 comprises a crystal oscillator 18₁ and a pseudorandom number generator 18₂. As will be described in more detail below, the crystal oscillator 18₁ is voltage controlled to allow some control of the frequency of the oscillator and thereby the number generator 18₂. This may be accomplished, for example, by means of a back-biased varactor diode connected within the crystal oscillator.

Figure 2:
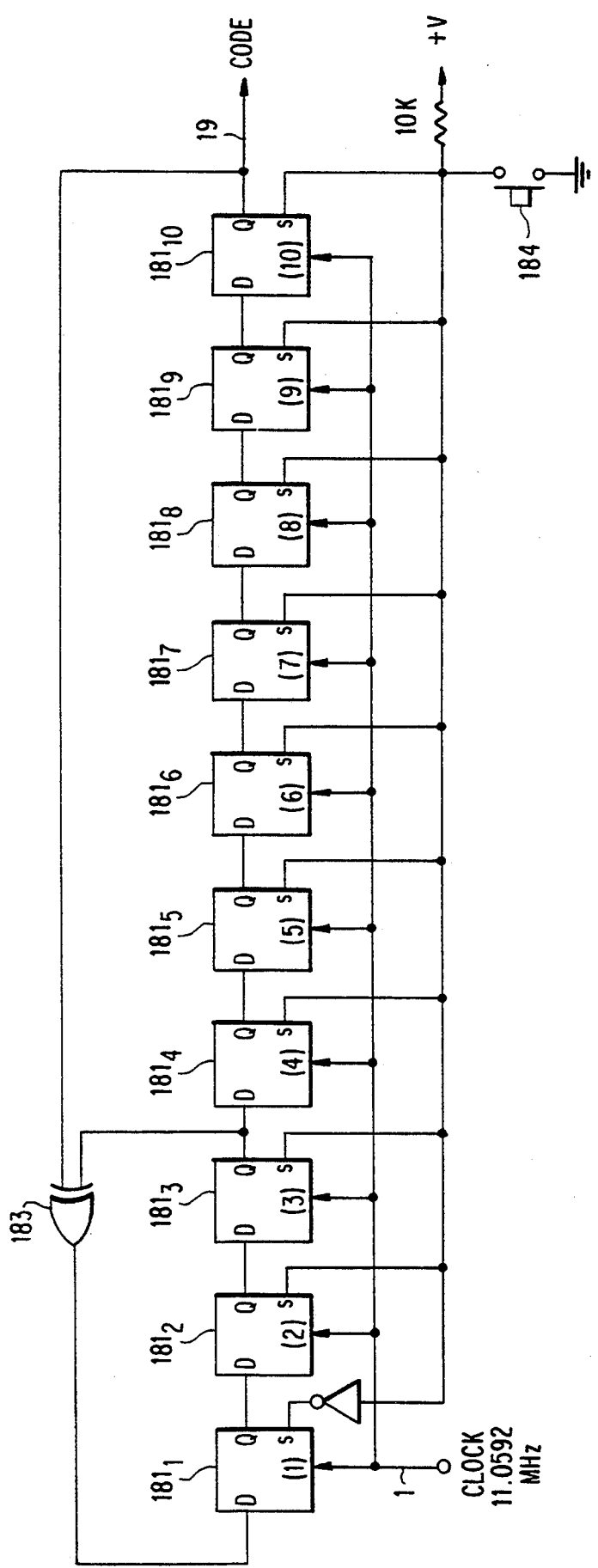
FIG. 2 is a block diagram showing a typical code generator used in the spread spectrum receiver of FIG. 1.

An example of the number generator 18₂ is shown in FIG. 2 as comprising a plurality of cascaded flip-flops $18_{2_1}$ to $18_{2_{10}}$ configured as shift register stages. Each of these stages receives a clock input from the crystal oscillator 18₁. The outputs of stages $18_{2_3}$ and $18_{2_{10}}$ are Exclusive ORed by Exclusive OR gate 18₃ and supplied to the D-input of the first stage $18_{2_1}$. The number code output is taken from the output of stage $18_{2_{10}}$. The number generator is reset by pressing reset button 18₄. The invertor 18₅ resets the first stage of the number generator to one, all other stages being reset to zero.

The output of the number generator 18₂ is used to phase shift key modulate a sine wave signal from signal synthesizer 20 in a bi-phase shift keyed (BPSK) modulator 22. The output of modulator 22 is amplified in amplifier 24 and applied to two pole bandpass filter 26 before applying the signal to mixer/correlator 16.

The difference signal output of the mixer/correlator 16 is a first intermediate frequency (IF) signal which is applied to a two pole bandpass filter 28 and then to a first IF amplifier 30, the signal output of which is applied to another two pole bandpass filter 32. The filtered and amplified IF signal from the filter 32 is applied to a second mixer 34. The second mixer 34 also receives an output signal from a crystal oscillator 35 which is mixed with the output signal from filter 32 to produce a difference output signal. This difference output signal is a second IF signal.

The output second IF signal from the second mixer 34 is applied to a bandpass filter 36 and then to a second IF amplifier 38, the signal output of which is applied to a bandpass filter 40. The output signal from filter 40 is applied to a limiter 42 which limits the amplitude variation of the signal. The limited signal output of the limiter 42 is input to a frequency modulation detector 44 the output signal of which controls a level detector 46 to recover, at baseband, the digital code.

The receiver as thus far described is a conventional double hetrodyne spread spectrum receiver of the direct sequence digital type in which a carrier is modulated by a digital code sequence whose bit rate is much higher than the information signal bandwidth. The key to the operation and reliable reception of the transmitted code lies in the initial synchronization and tracking of the input RF signal.

In the preferred embodiment of the invention, the second IF stage including the second mixer 34, bandpass filter 36, second IF amplifier 38, bandpass filter 40, and limiter 42 is implemented using a commercially available IF integrated circuit (IC), such as the Signetics SA 605 or equivalent. This circuit was specifically designed for use in cellular communications systems. As such, it incorporates a received signal strength indicator (RSSI) 50 which has a wide dynamic range. The RSSI 50 receives as its input a sampled signal of the second IF signal from the limiter 42.

The initial synchronization circuit is shown in FIG. 1 at 48 and responds to a signal from a received signal strength indicator (RSSI) 50 to apply a variable voltage to the voltage controlled crystal oscillator 18₁. The tracking circuit is shown in FIG. 1 at 52 and also responds to the output of RSSI 50 to apply a variable voltage to the voltage controlled crystal oscillator 18₁. The tracking circuit 52 is effective only after the initial synchronization circuit 48 acquires synchronization. The autocorrelation function for a binary code sequence causes the phase modulated signal to result in an amplitude modulated signal which is demodulated in the RSSI 50. This demodulated signal is used by both the initial synchronization circuit 48 and the tracking circuit 52 as a control signal.

The initial synchronization circuit for the spread spectrum receiver is of the sliding correlator type. This type of circuit is generally described by Dixon, supra, and operates its own code sequence generator 18 at a different rate than the transmitter's code generator so that the two code sequences slip in phase with one another. A coherent output is obtained when the receiver's code sequence comes into synchronization with the code sequence of the incoming signal.

Figure 3:
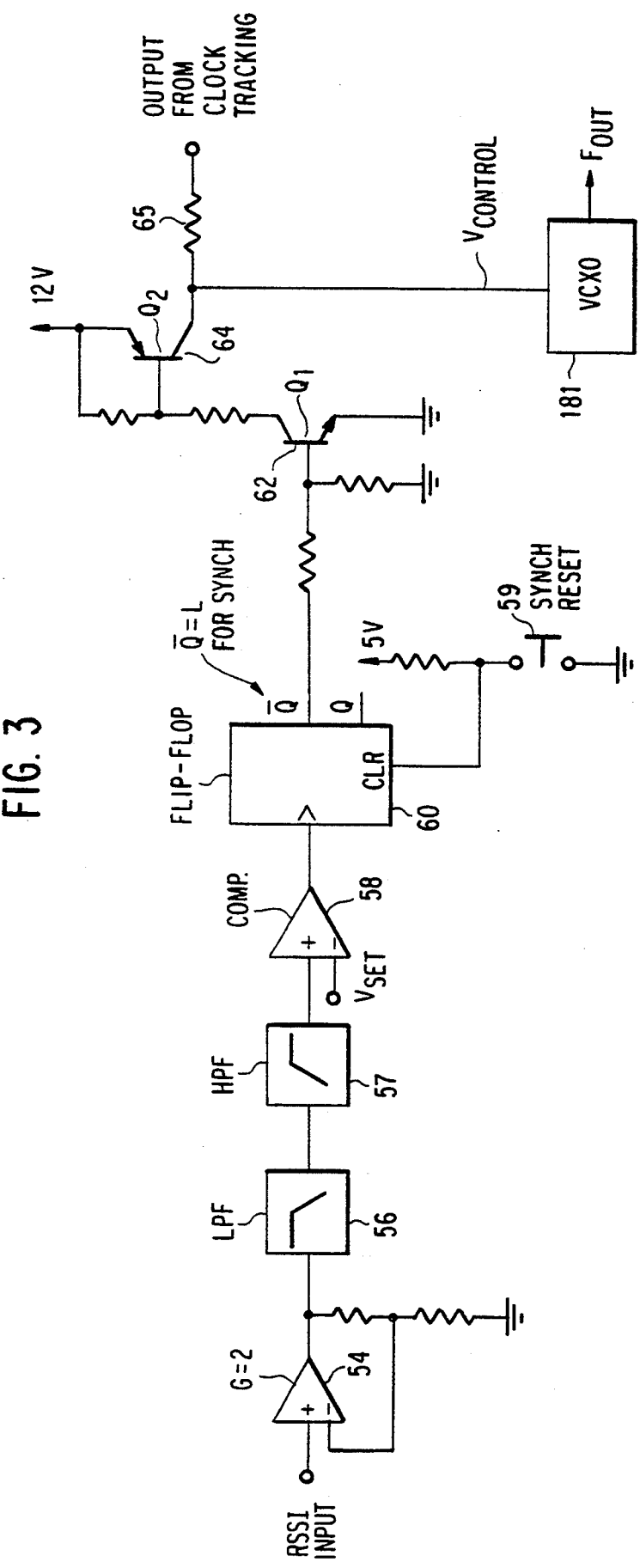
FIG. 3 is a schematic diagram of the initial synchronization circuit of the invention.

Referring to FIG. 3, the initial synchronization circuit comprises an operational amplifier 54 which amplifies the RSSI input with a gain of two. The output signal from amplifier 54 is applied to a low pass filter 56, which may be a simple resistor-capacitor (RC) network. The filtered output signal from filter 56 is applied to the non-inverting input of a second operational amplifier 58 configured as a comparator. RC coupling must be used between the filter 56 and the input of amplifier 58, effectively resulting in a high pass filter 57. The pass bands of the filters 56 and 57 are designed to overlap providing the effect of a bandpass filter. The inverting input of amplifier 58 is set such that the output changes state only when the correlation peak is present.

When it is desired to initially synchronize the receiver, a synchronization reset button 59 is pressed forcing output $\overline{Q}$ of flip-flop 60 to go high. The high level output from flip-flop 60 turns on NPN transistor 62 which turns on PNP transistor 64. The conduction of PNP transistor 64 reverse biases a varactor diode (not shown) in the voltage controlled crystal oscillator. The reversed biased varactor diode causes the oscillator 18₁ to move off frequency, allowing the receiver code to slip in phase as compared to the transmitter code sequence.

When the receiver sequence coincides with the incoming sequence, the correlation function present at the RSSI output is at a maximum. At that precise instant in time, the receiver is synchronized and the comparator 58 changes its output state. When the output state of the amplifier 58 changes state, the $\overline{Q}$ output of flip-flop 60 goes low turning off NPN transistor 62. When transistor 62 turns off, PNP transistor 64 also turns off, turning on the clock tracking signal controls to the voltage controlled crystal oscillator 18₁. When this happens, the receiver is in the clock tracking mode.

It will be observed that the collector connection of PNP transistor 64 to the voltage controlled crystal oscillator 18₁ is also connected via isolating resistor 65 to the output of the tracking circuit. This junction corresponds to the junction 49 shown in FIG. 1.

The tracking circuit for the spread spectrum receiver is classified as a Tau-dither clock tracking loop. The notion of "dither" is familiar to those skilled in feedback control systems. As described by Dixon, supra, Tau-dither tracking in spread spectrum systems makes use of the approximately triangular code correlation function possessed by binary codes. The idea is to cause the code phase in the receiver to remain as close as possible to a received code phase so that the timing of the two codes will remain essentially at the peak of correlation.

The tracking circuit is shown in FIG. 4, to which reference is now made. The RSSI input is amplified in operational amplifier 66 with a gain of two. The amplified output signal from amplifier 66 is applied to a bandpass filter 68 and then to a four quadrant analog multiplier 70. The other input to the multiplier 70 is derived from a 1 KHz sine wave oscillator 72. The 1 KHz sine wave signal is filtered by bandpass filter 74 before being applied to both the multiplier 70 and a 90° phase shift circuit 76. The multiplier may be, for example, an Analog Devices AD 632 IC. The purpose of the 90° phase shift is to compensate for the 90° phase shift caused by the frequency modulation process. The product output signal from multiplier 70 is filtered by switchable low pass filter 78, and the filtered output signal is summed with the output of phase shift circuit 76 in summer 80. The voltage signal output from summer 80 is applied to the voltage controlled crystal oscillator 181 via resistor 65 (FIG. 3) to track the incoming signal.

The voltage controlled crystal oscillator 181 is phase modulated by the 1 KHz sine wave signal with a d.c. offset. The phase modulation is ±0.1 chip, where a chip is one bit of code. The demodulated 1 KHz RSSI signal is buffered and amplified by amplifier 66. The bandpass filter 68 has a center frequency of 1 KHz and a bandwidth of 300 Hz. The resultant signal is applied to input $X_2$ of the analog multiplier 70 as a signal $A\sin\omega t$. The filtered signal from 1 KHz oscillator 72 is applied to input $Y_1$ of the analog multiplier 70 as a signal $B\sin\omega t$. A third input to the multiplier 70, designated as $Z_2$, is a preset negative voltage.

The output of the multiplier 70 (as configured) is defined as $-(X_2 x Y_1)/10 + Z_2$. Therefore, the output for this application is $-(AB/10)\sin^2\omega t + Z_2$. Using a trigonometric identity, the output can also be expressed as $-(AB/20)(1-\cos2\omega t) + Z_2$. This signal is low pass filtered by filter 78 which is a loop filter having two states depending on whether the condition is initial tracking or steady state tracking. Initially, the loop is very quick in its response time, but in the steady state condition, the response is slower so minor disturbances do not cause the loss of tracking.

Figure 5A:
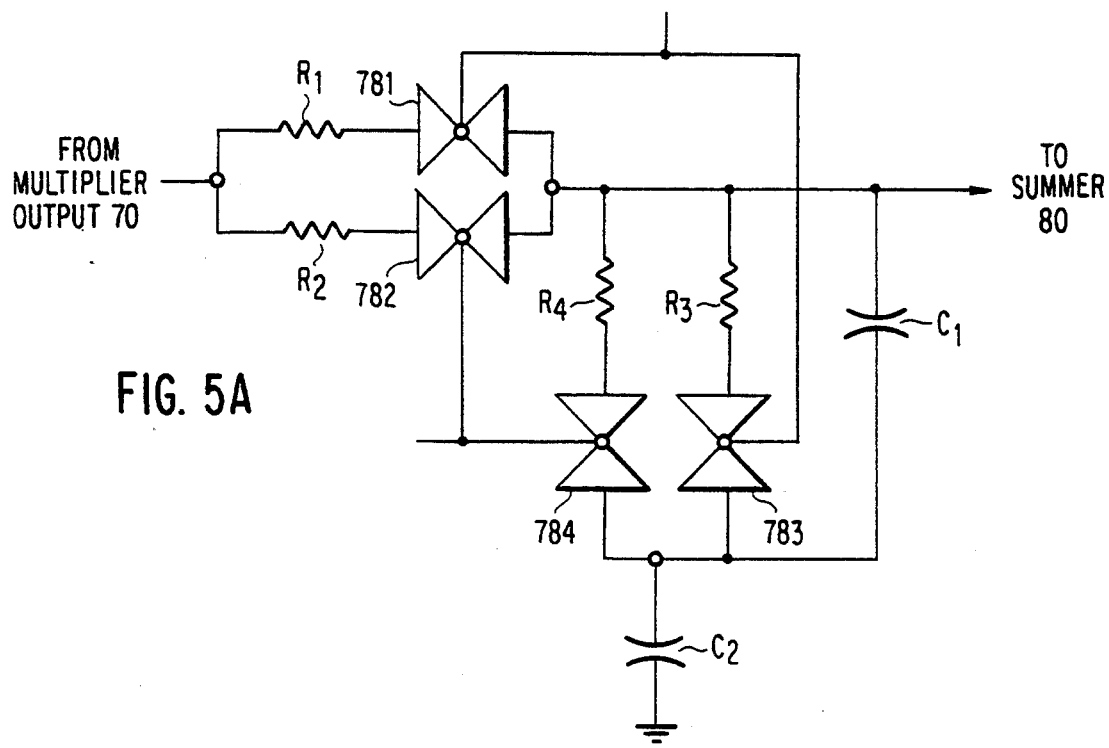
FIG. 5A is a simplified schematic diagram of the analog switch used in the loop filter.

The two state low pass filter is illustrated in FIG. 5, to which reference is now made. The filter comprises resistors $R_1$, $R_2$, $R_3$, and $R_4$ and capacitors $C_1$ and $C_2$. These circuit elements are switched by an analog switch 780 into one of two low pass filters having different time constants. The analog switch 780 may be a CD 4052 analog multiplexer; however, its functional operation is illustrated by the simplified schematic diagram in FIG. 5A, to which reference is now made. Switches 781, 782, 783, and 784 are used to select the combination of resistances in the circuit, thereby determining the time constant of the filter. For example, the switches 781 and 783 are used to select resistances $R_1$ and $R_3$ in the wideband state of the filter, and switches 782 and 784 are used to select resistances $R_2$ and $R_4$ in the narrow band state of the filter.

Returning now to FIG. 5, when the flip-flop 60 shown in FIG. 3 changes state upon the acquisition of synchronization, the $\overline{Q}$ output goes low. This output is applied to the input of an edge triggered timer circuit 785, such as a 74HCT123E monostable multivibrator. The time delay of the timer circuit is determined by the time constant of resistor $R_5$ and capacitor $C_3$. The output of the timer circuit 785 is applied to one input of an OR gate 786, the output of which is applied to the A select input of the analog switch 780. The other input of the OR gate 786 is connected to the $\overline{Q}$ output of flip-flop 60.

The truth table for the timer 185 is set out below:

| A | Q | |
|---|---|---|
| ↓ H | L | (one high level pulse width = $T = R_5C_3$) |

Thus, the duration of the pulse output establishes the duration of the first state of the low pass loop filter. The truth table for the analog switch 780 is as follows:

| | "ON CHANNELS" | |
|---|---|---|
| A | X | Y |
| 0 | $X_0$ | $Y_0$ |
| 1 | $X_1$ | $Y_1$ |

Initially, the $\overline{Q}$ output of flip-flop 60 is high applying a logical "1" to the A select input of the analog switch 780. When the $\overline{Q}$ output of flip-flop 60 goes low when synchronization is achieved, the output of the timer 785 continues to apply a logical "1" via OR gate 786 to the A select input for a time period determined by the $R_5C_3$ time constant. Thereafter, a logical "0" is applied to the A select input.

Returning now to FIG. 4, the resultant signal from the two state filter 78 is a low frequency slowly varying but mainly d.c. signal proportional to $-(AB/20) + Z_2$ which is applied to the summer 80. The filtered 1 KHz sine wave signal shifted by 90° is summed with the d.c. signal at summer 80.

The tracking circuit is designed so that the d.c. term, when applied to the voltage controlled crystal oscillator 181, adjusts its output frequency either higher or lower to dither ±0.1 chip from the peak of the triangular correlation function. The d.c. term holds the VCXO exactly on frequency, while the a.c. 1 KHz signal causes dither. The peak of the correlation function is where the optimum signal-to-noise (S/N) ratio occurs and where the recovered data signal level is maximized. The peak of the correlation function is also where the amplitude modulation is at a minimum and thus where the recovered 1 KHz signal is nulled. At this point, the output of the analog multiplier 70 will be dominated by $Z_2$ with only a small contribution from the nulled 1 KHz signal.

Figure 6:
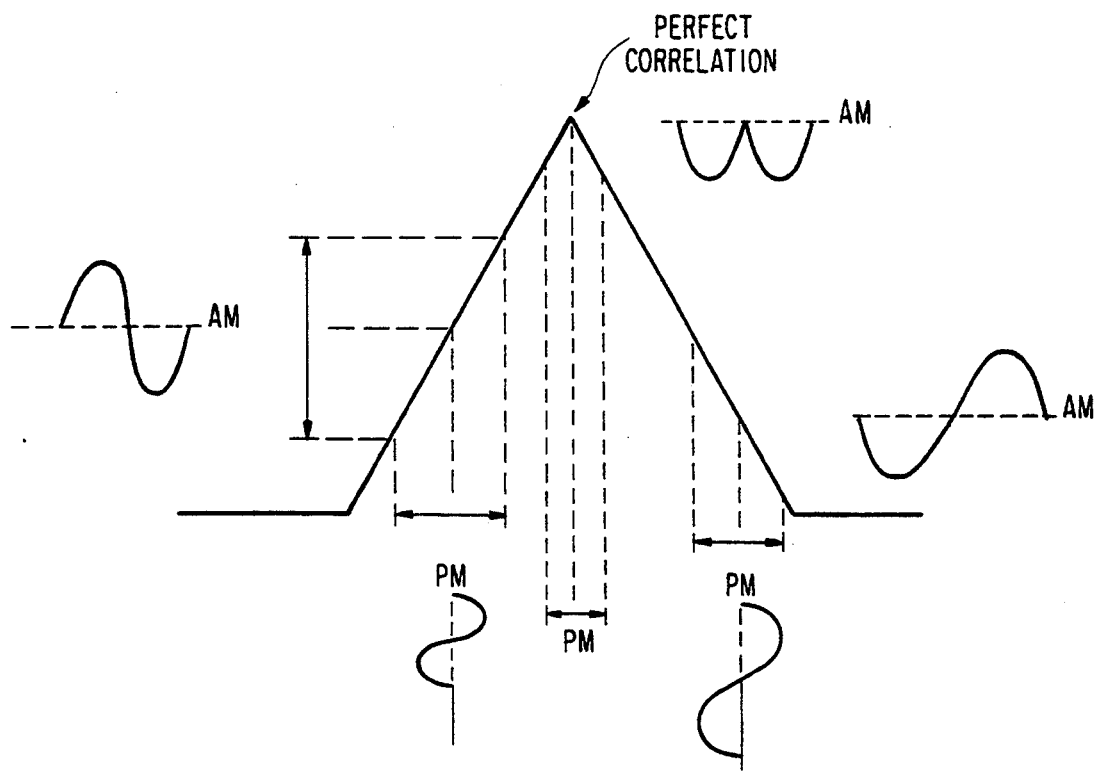
FIG. 6 is a graph representing the triangular correlation function and illustrating the operation of the tracking circuit shown in FIG. 4.

FIG. 6 shows the operation of the tracking circuit. The d.c. voltage $Z_2$ is adjusted to set the frequency of the voltage controlled crystal oscillator 181. As shown in FIG. 6, the phase modulation (PM) of the code clock (oscillator 181) results in amplitude modulation (AM) which is demodulated by RSSI 50. The AM detected wave is shifted 180° from the left to the right side of the triangular correlation peak. At perfect correlation, only d.c. and harmonics of sinewave are present, the fundamental being effectively suppressed. The bandpass filter 68 eliminates the harmonics.

While the invention has been described in terms of a single preferred embodiment, those skilled in the art will recognize that the invention can be practiced with modification within the spirit and scope of the appended claims. For example, many of the functions performed by discrete circuits, such as the timer 785 in FIG. 5, can be performed by a suitably programmed microprocessor, thereby further simplifying the manufacture of the spread spectrum receiver according to the claimed invention.

Having thus described my invention, what I claim as new and desire to secure by Letters Patent is as follows:

1. A direct sequence digital spread spectrum receiver comprising:

radio frequency input means for receiving a radio frequency signal;

mixer/correlator means for combining said radio frequency signal with a reference signal and generating an intermediate frequency signal;

intermediate frequency means for amplifying, filtering and limiting said intermediate frequency signal, said intermediate frequency means generating a limited, frequency modulated output and a received signal strength indicator signal;

detector means responsive to said limited, frequency modulated output for generating a digital data output signal;

code generator means for generating a receiver pseudorandom digital code sequence, said code generator means including a voltage controlled crystal oscillator driving a pseudorandom number generator;

sinewave generator means for generating a reference sinewave signal;

bi-phase shift keyed modulator means responsive to said pseudorandom digital code for modulating said reference sinewave signal to generate said reference signal for said mixer/correlator means;

initial synchronization means responsive to said received signal strength indicator signal for generating a first control voltage for said voltage controlled crystal oscillator for causing said receiver pseudorandom code sequence generated by said code generator means to slip with respect to a received code sequence, said initial synchronization means including means for detecting when said receiver pseudorandom code sequence coincides with said received code sequence and generating a detection output signal; and tracking means responsive to said received signal strength indicator signal for generating a second control voltage for said voltage controlled crystal oscillator for frequency modulating an output of said voltage controlled crystal oscillator to accurately track said received code sequence with said receiver pseudorandom code sequence.

2. The direct sequence digital spread spectrum receiver recited in claim 1 wherein said tracking means comprises:

oscillator means for generating a second sinewave signal;

analog multiplier means for multiplying said received signal strength indicator signal with said second sinewave signal to produce a product signal;

low pass filter means for filtering said product signal;

phase shift means for shifting said second sinewave signal by 90°; and summing means for adding the filtered product signal and the 90° phase shifted second sinewave signal to generate said second control voltage.

3. The direct sequence digital spread spectrum receiver recited in claim 2 wherein said low pass filter means is a two state filter having a wide bandwidth state for initial acquisition and tracking and a narrow bandwidth state for closely tracking said received code sequence.

4. The direct sequence digital spread spectrum receiver recited in claim 3 wherein said two state filter comprises:

timer means responsive to said detection output signal from said initial synchronization means for generating a delayed output signal; and switching means responsive to said delayed output signal for switching said two state filter from said wide bandwidth state to said narrow bandwidth state.

5. The direct sequence digital spread spectrum receiver recited in claim 4 wherein said means for detecting in said initial synchronization means comprises comparator means responsive to said received signal strength indicator signal and to a preset voltage level for changing states when said received signal strength indicator signal equals said preset voltage level.

* * * * *